United States Patent
Matula et al.

(10) Patent No.: US 11,289,077 B2
(45) Date of Patent: Mar. 29, 2022

(54) SYSTEMS AND METHODS FOR SPEECH ANALYTICS AND PHRASE SPOTTING USING PHONEME SEQUENCES

(71) Applicant: Avaya Inc., Basking Ridge, NJ (US)

(72) Inventors: Valentine C. Matula, Granville, OH (US); Shmuel Shaffer, Palo Alto, CA (US)

(73) Assignee: Avaya Inc., Basking Ridge, NJ (US)

( * ) Notice: Subject to any disclaimer, the term of this patent is extended or adjusted under 35 U.S.C. 154(b) by 343 days.

(21) Appl. No.: 14/332,115

(22) Filed: Jul. 15, 2014

(65) Prior Publication Data
US 2016/0019882 A1    Jan. 21, 2016

(51) Int. Cl.
G10L 15/18    (2013.01)
G10L 15/187   (2013.01)
G10L 25/51    (2013.01)
G10L 15/02    (2006.01)

(52) U.S. Cl.
CPC ............ G10L 15/187 (2013.01); G10L 25/51 (2013.01); G10L 2015/025 (2013.01)

(58) Field of Classification Search
CPC ......... G10L 25/63; G10L 15/18; G10L 15/00; G10L 15/187; G06F 2203/011
See application file for complete search history.

(56) References Cited

U.S. PATENT DOCUMENTS

| | | | | |
|---|---|---|---|---|
| 7,092,888 B1 * | 8/2006 | McCarthy | ............. | G10L 15/063 379/88.01 |
| 7,664,636 B1 * | 2/2010 | Hirschberg | ............. | G10L 17/04 379/1.02 |
| 8,069,044 B1 * | 11/2011 | Moorer | ................. | G06F 16/683 704/254 |
| 2002/0010584 A1 * | 1/2002 | Schultz | ..................... | G06F 3/16 704/270 |
| 2003/0182123 A1 * | 9/2003 | Mitsuyoshi | ............. | G10L 17/26 704/270 |
| 2003/0225581 A1 * | 12/2003 | Takiguchi | ............... | G10L 15/30 704/256.5 |
| 2003/0229497 A1 * | 12/2003 | Wilson | ..................... | G09B 5/04 704/270.1 |
| 2006/0069559 A1 * | 3/2006 | Ariyoshi | ............... | G10L 13/033 704/246 |
| 2007/0208569 A1 * | 9/2007 | Subramanian | ...... | G10L 19/0018 704/270 |
| 2007/0294229 A1 * | 12/2007 | Au | ..................... | G06F 17/30864 |
| 2009/0125534 A1 * | 5/2009 | Morton | ............... | G06F 17/3002 |

(Continued)

OTHER PUBLICATIONS

Official Action for India Patent Application No. 1072/MUM/2015, dated Mar. 29, 2019 6 pages.

*Primary Examiner* — Mark Villena

(74) *Attorney, Agent, or Firm* — Sheridan Ross P.C.

(57) ABSTRACT

A contact center system can receive audio messages. The system can review audio messages by identifying phoneme strings within the audio messages associated with a characteristic. A phoneme can be a component of spoken language. Identified phoneme strings are used to analyze subsequent audio messages to determine the presence of the characteristic without requiring human analysis. Thus, the identification of phoneme strings then can be used to determine a characteristic of audio messages without transcribing the messages.

20 Claims, 9 Drawing Sheets

(56) References Cited

U.S. PATENT DOCUMENTS

| | | | |
|---|---|---|---|
| 2009/0182559 A1* | 7/2009 | Gerl | G10L 15/08 704/235 |
| 2009/0278851 A1* | 11/2009 | Ach | G06T 13/205 345/473 |
| 2009/0313019 A1* | 12/2009 | Kato | G10L 17/26 704/254 |
| 2009/0326945 A1* | 12/2009 | Tian | G10L 15/005 704/254 |
| 2010/0070263 A1* | 3/2010 | Goto | G06F 16/68 704/8 |
| 2010/0217595 A1* | 8/2010 | Kim | G10L 17/26 704/250 |
| 2010/0256972 A1* | 10/2010 | Grenier | G06F 17/289 704/2 |
| 2010/0312557 A1* | 12/2010 | Strom | G10L 15/065 704/246 |
| 2011/0004473 A1* | 1/2011 | Laperdon | G10L 15/02 704/243 |
| 2011/0035219 A1* | 2/2011 | Kadirkamanathan | G10L 15/005 704/239 |
| 2011/0093272 A1* | 4/2011 | Isobe | G10L 13/10 704/258 |
| 2011/0307257 A1* | 12/2011 | Pereg | G06Q 10/063 704/251 |
| 2013/0030789 A1* | 1/2013 | Dalce | G06F 17/289 704/2 |
| 2013/0083904 A1 | 4/2013 | Anderson | |
| 2013/0234933 A1* | 9/2013 | Reitan | G06F 3/011 345/156 |
| 2013/0304587 A1* | 11/2013 | Ralston | G06Q 30/0271 705/14.67 |
| 2014/0108935 A1* | 4/2014 | Yuen | G06F 3/048 715/728 |
| 2014/0112556 A1* | 4/2014 | Kalinli-Akbacak | G10L 25/63 382/128 |
| 2014/0114655 A1* | 4/2014 | Kalinli-Akbacak | G10L 25/63 704/231 |
| 2014/0122087 A1* | 5/2014 | Macho | G10L 17/22 704/275 |
| 2014/0222920 A1* | 8/2014 | Priebe | H04L 51/00 709/204 |
| 2014/0237277 A1* | 8/2014 | Mallinson | G06F 1/3206 713/323 |
| 2015/0161985 A1* | 6/2015 | Peng | G10L 15/26 704/235 |
| 2016/0171100 A1* | 6/2016 | Fujita | G06F 16/24578 707/722 |

\* cited by examiner

SYSTEMS AND METHODS FOR SPEECH ANALYTICS AND PHRASE SPOTTING USING PHONEME SEQUENCES

BACKGROUND

Speech analytics is a group of methods often employed to automatically characterize aspects of a conversation (i.e., a caller expressing dissatisfaction, a caller discussing a particular topic, etc.). One method to characterize a conversation is to define a set of keywords and/or phrases, and then associate those identified keywords and/or phrases with the characteristic or event, e.g., because this "phrase" was said, the phrase implies the caller had this "emotion," or the caller discussed this "topic." Content that may be characterized can include topics, emotions, hold and periods of silence, and business intelligence.

Other important problems in contact centers are automatic identification of new topics being discussed by agents and new vocabulary. Typically, contact centers have a large amount of historical data on each call, including the speech recording itself. Any given set of calls can easily be classified by hand, for example, into successful and non-successful calls. One can use speech analytics to separate calls into subsets by searching for "meaningful phrases". Typically, there will be a set of phrases that are present in one subset of calls, but not in the other subset(s). By identifying the meaningful phrases that act as indicators for the type of call, a system or administrator can search for the meaningful phrase(s), and then classify the call into the proper subset.

The difficulty in this approach is twofold: first, one must determine the meaningful phrases by listening to calls and/or using human judgment to identify phrases or by transcribing a set of calls and then using techniques such as Latent Semantic Indexing on the transcriptions to identify words or word sequences that are meaningful phrases. Transcription is costly and time-intensive. The second difficulty of this approach is that once the meaningful phrases have been identified, one must find them or determine their absence or presence in new calls as they are captured in a system to classify new calls. There have been other methods introduced to find meaningful phrases. However, those approaches still require the transcription of many calls. Furthermore, if automated transcription tools are not available for a specific language, then the transcription, used to start the training process, must be done by manually.

SUMMARY

It is with respect to the above issues and other problems that the embodiments presented herein were contemplated. Embodiments include a method for determining sentiment in a foreign language, the method comprising: retrieving one or more sentiment terms with known sentiment in the foreign language, wherein the one or more terms are associated with one or more phoneme sequences in one or more different languages; identifying, by a processor, a first term of the one or more terms associated with a phoneme sequence in a message; and based on the identification of the first term, determining that the message has a known sentiment.

An aspect of the above method includes further comprises: receiving a second message in the foreign language; identifying a phoneme sequence within the second message; analyzing the second message for a sentiment term in the foreign language; and storing the sentiment term.

An aspect of the above method further comprises determining statistical information about the sentiment term.

An aspect of the above method includes wherein the statistical information includes a confidence score that the sentiment term indicates a sentiment, and wherein the sentiment may be positive or negative.

An aspect of the above method further comprises: receiving a new set of audio messages; identifying a second phoneme string in the new set of audio messages, wherein the second phoneme string includes a second phoneme, and wherein the second phoneme string is associated with a second characteristic; comparing the second phoneme string in the new set of audio messages with at least two audio messages in an old set of audio messages; based on the comparison, determining that the second phoneme string is absent from the old set of audio messages; and determining that the second characteristic is a new topic present in the new set of audio messages.

An aspect of the above method includes wherein the confidence score is a probability, the method further comprises: determining if the confidence score reaches or crosses a predetermined threshold; and if the confidence score reaches or crosses the predetermined threshold, signifying that the sentiment term indicates a known sentiment.

An aspect of the above method further comprising: if the confidence score does not reach or cross the predetermined threshold, receiving a third message; re-calculating the confidence score using analysis associated with the third message.

An aspect of the above method includes wherein each seeding term includes two or more sentiment terms associated therewith.

An aspect of the above method includes wherein each message includes two or more seeding terms.

An aspect of the above method includes wherein at least one of the seeding terms is in English.

An aspect of the above method further comprises: analyzing a known negative/positive message; identifying seeding terms; and storing the seeding terms.

A computer readable medium having stored thereon processor executable instructions that cause a computing system to execute a method for generating an agent routing, the instructions comprising: instructions to receive a first message in the foreign language; instructions to identify a phoneme sequence within the first message, wherein the phoneme sequence is in a different language; instructions to analyze the first message for a sentiment term in the foreign language; instructions to store the sentiment term; instructions to retrieve the sentiment term with known sentiment in the foreign language; instructions to identify the sentiment term, associated with a phoneme sequence, in a second message; and based on the identification of the sentiment term, instructions to determine that the second message has a known sentiment.

An aspect of the above computer readable medium further comprises instructions to determine statistical information about the sentiment term, wherein the statistical information includes a confidence score that the sentiment term indicates a sentiment.

An aspect of the above computer readable medium further comprises: instructions to determine if the confidence score reaches or crosses a predetermined threshold; if the confidence score reaches or crosses the predetermined threshold, instructions to signify that the sentiment term indicates a known sentiment; if the confidence score does not reach or cross the predetermined threshold, instructions to receive a third message; and instructions to re-calculate the confidence score use analysis associated with the third message.

An aspect of the above computer readable medium includes wherein each seeding term includes two or more sentiment terms associated therewith.

An aspect of the above computer readable medium includes wherein each message includes two or more seeding terms, and wherein at least one of the seeding terms is in English.

A communication system comprising: a social media gateway in communication with a social media network, the social media gateway operable to receive a social media message, from a customer, on the social media network; a dialog system in communication with the social media gateway, the dialog system operable to determine an agent routing for the social media message, wherein the dialog system compromises: a text processing component that is operable to receive and analyze the social media message, wherein the text processing component compromises: a phoneme identifier operable to: receive a first message in the foreign language; identify a phoneme sequence within the first message, wherein the phoneme sequence is in a different language; a negative term identifier in communication with the phoneme sequence identifier, wherein the negative term identifier is operable to analyze the first message for a sentiment term in the foreign language; a parser in communication with the negative term identifier, wherein the parser is operable store the sentiment term; a negative message identifier in communication with the parser, wherein the negative message identifier is operable to: retrieve the sentiment term with known sentiment in the foreign language; identify the sentiment term, associated with a phoneme sequence, in a second message; and based on the identification of the sentiment term, determine that the second message has a known sentiment.

An aspect of the above communication system further comprises a statistics analyzer in communication with the parser, wherein the statistics analyzer is operable to determine statistical information about the sentiment term, wherein the statistical information includes a confidence score that the sentiment term indicates a sentiment.

An aspect of the above communication system includes wherein the statistics analyzer is further operable to: determine if the confidence score reaches or crosses a predetermined threshold; if the confidence score reaches or crosses the predetermined threshold, signify that the sentiment term indicates a known sentiment; if the confidence score does not reach or cross the predetermined threshold, receive a third message; and instructions to re-calculate the confidence score use analysis associated with the third message.

An aspect of the above communication system includes wherein each seeding term includes two or more sentiment terms associated therewith.

An aspect of the above communication system includes wherein each message includes two or more seeding terms, and wherein at least one of the seeding terms is in English.

The embodiments described herein solve the problems mentioned above by providing a method that works solely at the phoneme level. This approach removes the need for attempting to decide on meaningful phrases. It also removes the need to perform transcription (either automated or by human transcribers) as an input to techniques such as LSI. Thus, the embodiments significantly reduce the effort and cost in creating or updating phoneme-based call analyzers.

The embodiments solve the "new vocabulary" process very easily by simply categorizing all prior calls as "old vocabulary" and new calls as a second set and then using the technique to identify what phrases would characterize new calls. By definition, the phrases are seen only in new calls, and thus represent new topics or new vocabulary.

The embodiments here use techniques similar to Latent Semantic Indexing (LSS) and Inverse Document Frequency (IDF) at the phoneme level to identify those phoneme sequences in conversations that appear in one set of calls but not in others. In other words, a set of phoneme sequences can be used to classify or identify new calls into one of the training sets. Latent Semantic Analysis is a method used to extract and represent the contextual-usage meaning of words by statistical computations applied to a large body of text. All of the contexts in which a given word does and does not appear provide a set of constraints that determine the similarity of word meanings and sets of words to each other. Inverse Document Frequency is a popular measure of a word's importance. Inverse document frequency (IDF) is commonly used in Information Retrieval (Sparck Jones, 1972). IDF is defined as $-\log 2dfw/D$, where D is the number of documents in the collection and dfw is the document frequency, the number of documents that contain w.

The approach can perform LSI/IDF techniques to identify phoneme strings or strings that can be used to classify new calls. Once identified, these strings can:

1) Be used outright, without regard for what phrases they actually represent;

2) Be used by a human to listen to representative calls, where the phoneme sequences were marked. By listening to the surrounding speech, they could identify the actual phrase(s) being spoken. Based on this analysis, new speech search packs could be constructed. The advantage here is that by using the speech pack construction method, alternative pronunciations may be added automatically to the search, thus improving the accuracy of subsequent searches;

3) An automated speech recognizer could be employed to do #2;

4) By hearing these new 'marker' phrases, a human could then extrapolate and think of other, similar phrases that would also characterize and differentiate these calls, even if these additional phrases were not observed in the original sample training sets.

The system may be operable to categorize: successful sales calls by a first group of phoneme strings or sequences, which can be used to search other in-coming calls; unsuccessful sales calls by a second group of phonemes sets or sequences, which can be used to search other in-coming calls.

In addition to the current practice of doing the searches by keywords and phrases to provide categorization, the system can do these new searches at the phoneme level with the searches at the word level. The system can characterize phoneme phrases and use the phrases at the word level, if appropriate. With both methods available, the system can find an actual phrase in a recording and listen and highlight the phoneme and/or the word/phrase to provide validation. For new operations, the system may be operable to learn additional words, phonemes, phrases, and parameters within the domain.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of B, or C" and "A, B, and/or C" means A alone, B alone, C alone, A and B together, A and C together, B and C together, or A, B and C together.

The term "phoneme" can refer to a perceptually distinct unit of sound in a specified language that distinguish one "word" or one "character" from another. A phoneme may be regarded as an abstraction of a set of speech sounds which are perceived as equivalent to each other in a given language.

The term "phoneme string" can refer to any two or more phonemes that have temporal, spatial, or other association and may be used to identify a word, character, sentiment, etc. in a native language. The sentiment may connote a positive or negative sentiment.

The term "index file" can refer to any document or data structure that lists one or more phonemes present in a received audio message.

A set of index files can be a collection of two or more index files. A set of index files may be a same or similar characteristic.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may b any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation, or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects can be separately claimed.

The term "in communication with" as used herein refers to any coupling, connection, or interaction using electrical signals to exchange information or data, using any system, hardware, software, protocol, or format.

The term "social media network" or "social media" is a service provider that builds online communities of people, who share interests and/or activities, or who are interested in exploring the interests and activities of others. Generally, social media are web-based and provide a variety of ways for users to interact, such as e-mail and instant messaging services.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. Various changes may be made in the function and arrangement of elements of the embodiment without departing from the spirit and scope of the appended claims.

Figure 1:
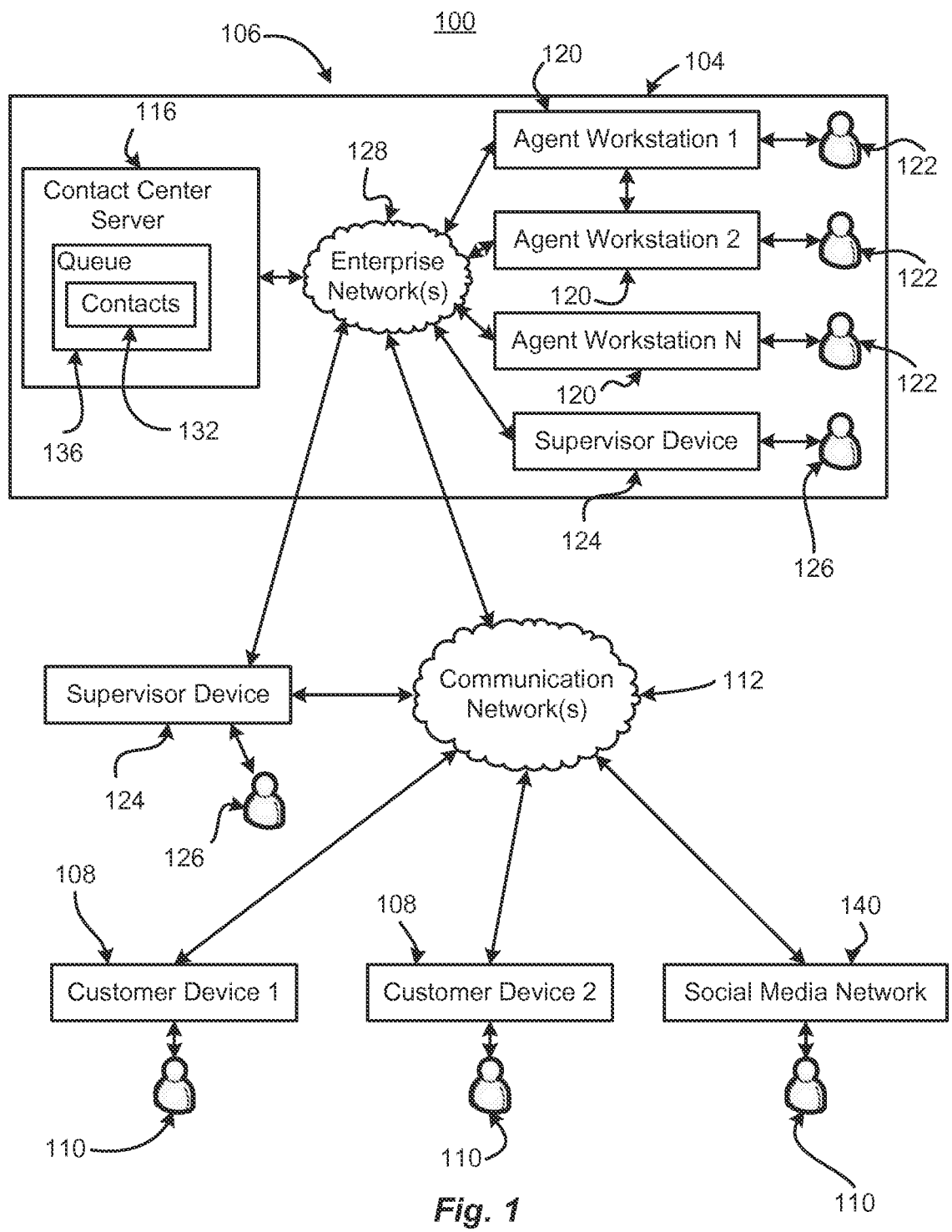
FIG. 1 is a block diagram of an embodiment of a communication system operable to interact with persons.

A block diagram depicting components of a communication system 100 is shown in FIG. 1. In particular, the communication system 100 can include a contact center 104. In general, the contact center 104 can be in communication with one or more customer endpoints or devices 108 via one or more communication networks 112. Examples of customer endpoints 108 can include one or more of but are not limited to, smartphones, desktop computers, laptop computers, or any other device capable of supporting communications between a customer and a customer service or other agent associated with the contact center 104 using written, oral, and/or electronic communications. Accordingly, communications between the contact center 104 and the customer endpoints 108 can comprise email, instant messaging, a telephone call, short message system, or other real time or non-real time communications. The communication network 112 can include the Internet, a local area network (LAN), wide area network (WAN), public switched telephone network (PSTN), wireless networks, or a plurality of networks in any combination.

The contact center 104 generally includes a call or contact center server 116, such as an automatic contact (or call) distribution system (ACD) server 116. The ACD server 116 is illustratively the Communication Manager™ enterprise communication-based ACD system available from Avaya Inc. The ACD server is interconnected to a plurality of agent workstations or endpoints 120. For example, the agent workstations 120 may be connected to the ACD server 116 by an enterprise network or networks 128. A general embodiment directed to recorded conversations is presented herein. The embodiments may apply to other audio communications whether recorded or in real time between a customer and an agent. Further, the embodiments herein may include messages recorded or provided at a social media network.

The contact center server 116 generally functions to connect agent workstations 120 to customer devices or endpoints 108 through the communication network 112 and/or enterprise network 128, to allow the agents 122 to service customer 110 contacts 132. The contacts can comprise written and/or electronic communications. However, contacts are not necessarily limited to written communications. For example, the contact center 106 can additionally handle voice contacts. The contact center server 116 can maintain one or more queues 136 for organizing and maintaining or holding contacts 132 waiting for handling by a contact center agent 122. For example, a plurality of queues 136 can be provided to sort contacts according to various parameters. Agents 122 associated with the agent workstations 120 are assigned to provide services to contacts 132 that have been placed within one or more of the queues 136 based on availability and/or weighting factors. Moreover, the workstations 120, which can comprise general purpose computers, thin client devices, or other devices, generally support the delivery of customer contacts to associated agents 122, and to receive replies to the customer contacts from the agents 122. In addition, the agent workstations 120 can include a user output in the form of a display that can present a determined sentiment or sentiment indicator for a contact, or aggregation of contacts, to associated agents 122.

In addition, system 100, as described herein, can include one or more supervisor or administrator devices 124. The supervisor device 124 is generally in communication with the contact center server 116 via the communication network 112 and/or the enterprise network 128. For example, if the supervisor device 124 is on the premises of the contact center 104, communications with the contact center server 116 may be over a portion of the enterprise network 128 comprising a wired or wireless network. As another example, the supervisor device 124 may be in communication with the contact center server 116 over the communication network 112 and/or the enterprise network 128, for example via a cellular telephony data network, a wired or wireless connection outside of the enterprise network 128, or the like. In general, the supervisor device 124 comprises functionality that allows a supervisor 126 to monitor the health of the contact center 104, and to control aspects of the operation of the contact center 104. Moreover, the supervisor device 124 can present a sentiment indicator for a contact or aggregation of contacts to a supervisor 126. Accordingly, the supervisor device 124 can comprise any device, including a mobile device, capable of presenting information to a supervisor 126. Accordingly, examples of a supervisor device 124 include, but are not limited to, a tablet computer, a smartphone, a laptop computer, a desktop computer, a netbook, or the like.

The communication system 100 can also include connections to one or more types of social media networks or systems, such as social media network 140. Social media networks 140 can be any social media including, but not limited to, networks, websites, or computer enabled systems. For example, a social media network may be MySpace™, Facebook™, Twitter™, Linked-In™, Spoke™, Sina Weibo, Pantip, or other similar computer enabled systems or websites.

The network(s) 128, 112 can be any network, as described in conjunction with FIG. 1A, which allow communication between the contact center 116 and the one or more social media networks 140. The network(s) 128, 112 can represent any communication system, whether wired or wireless, using any protocol and/or format. The network(s) 128, 112 provides communication capability for the contact center 116 to communicate with websites or systems corresponding to the one or more social media networks 140. The network(s) 128, 112 may be as described in conjunction with FIGS. 7 and 8.

A contact center 116 can be a system that can communicate with one or more persons that use social media networking sites 140. The contact center 116 can be hardware, software, or a combination of hardware and software. The contact center 116 can be executed by one or more servers or computer systems, as described in conjunction with FIGS. 7 and 8. The contact center 116 can include all systems, whether hardware or software, that allow the contact center 116 to receive, service, and respond to directed and non-directed contacts. For example, the contact center 116 can include the telephone or email system, an interface to human agents, systems to allow human agents to service and respond to received contacts, and one or more systems operable to analyze and improve the function of agent interaction.

The contact center 116 may include a dialog system 160a. While the dialog system 160 is shown as being a part of the contact center system 116, in other situations, the dialog system 160 is a separate system or function executed separately from the contact center 116 and/or executed by a third party. The dialog system 160 may process and receive messages or other communications. An embodiment of the dialog system 160 is described in conjunction with FIG. 2.

The contact center 116 may also communicate with one or more communication devices 108. The communication devices 108 can represent a customer's or user's cell phone, email system, personal digital assistant, laptop computer, or other device that allows the contact center 116 to interact with the customer. The contact center 116 can modify a non-direct contact into a directed contact by sending a response message directly to a customer's communication device 108.

Figure 2:
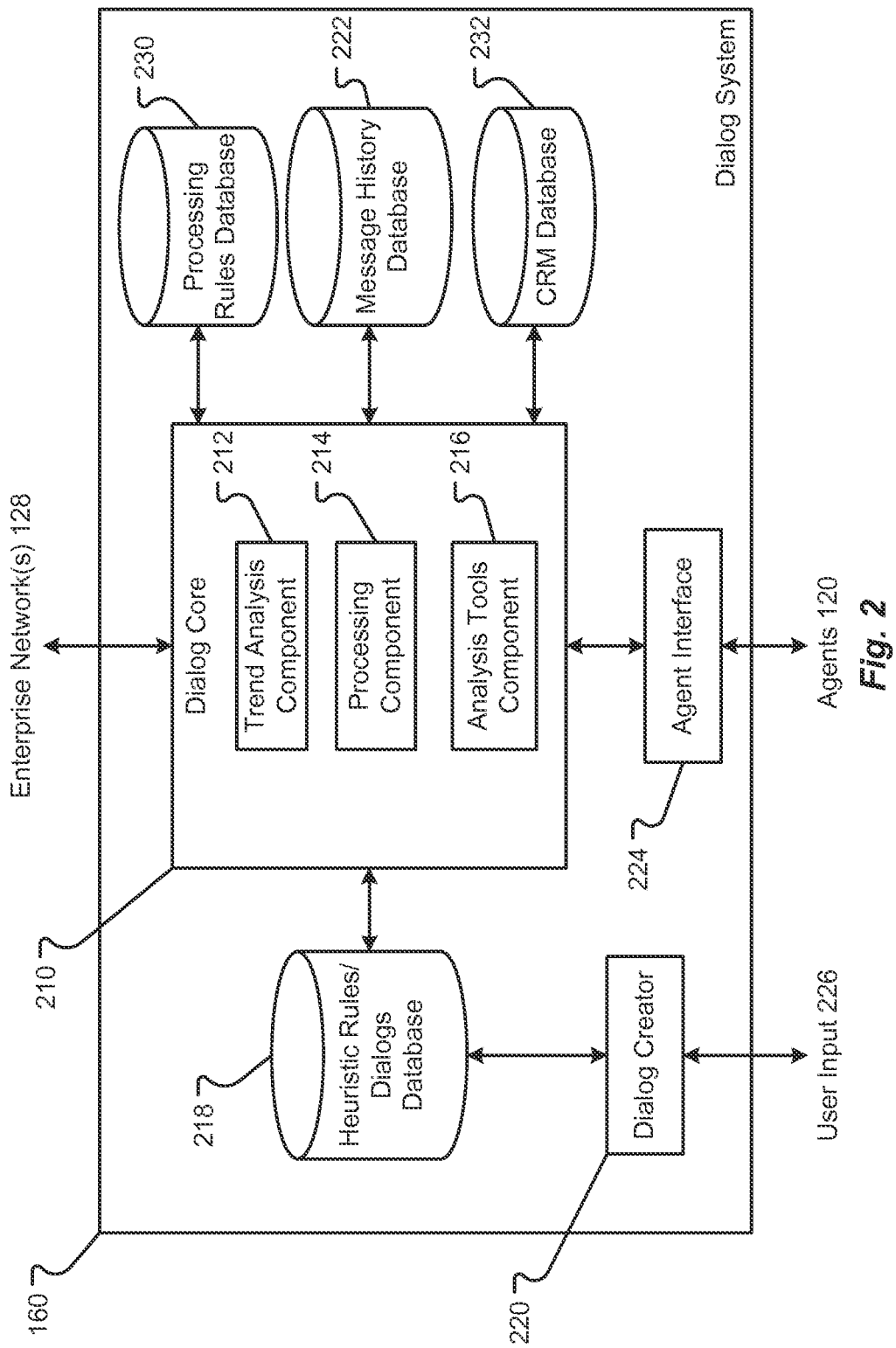
FIG. 2 is a block diagram of an embodiment of a dialog system.

An embodiment of the dialog system 160 is shown in FIG. 2. The dialog system 160 can include one or more components which may be hardware, software, or a combination of hardware and software. The dialog system 160 can be executed by a computer system such as those described in conjunction with FIGS. 7 and 8. However, in other embodiments, the components described in conjunction with FIG. 2B, are logic circuits or other specially-designed hardware that are embodied in a FPGA, ASIC, or other specially-designed hardware. The components contained within the dialog system 160 can include a dialog core 210 that is communication with a message history database 222, an agent interface 224, and a heuristic rules and dialogs database 218. Further, the heuristic rules and dialogs database 218 can be in communication with a dialog creator 220.

The dialog core 210 can include one or more subcomponents. For example, the dialog core 210 can include a trend analysis component 212, a processing component 214, and an analysis tools component 216. These components, similar to the components for the dialog system 160, can be hardware, software, or combination of hardware and software. The dialog core 210 may step through the states of a dialog data structure. A dialog data structure can include a set of inputs and associated actions that can be taken which allow for the automatic and structured response to requests or other communications and messages. For example, if a user asks for a manual, the input of the text word "manual" can cause the dialog system 160, in accordance with a dialog data structure, to send information about one or more manuals. In turn, the receiver of the response may respond, in kind, with the selection of a certain user manual. In which case, the dialog data structure may then instruct the dialog core 210 to send the user to a website where the user can retrieve an electronic version of the manual. As such, the dialog data structure provides a script a dialog that allows the dialog core 210 to automate the interaction between the contact center 116 and a person. This automation eliminates the need for agent involvement, in some situations, and makes the contact center 116 more efficient and more effective. Further, the automation expands the contact center's ability to answer numerous messages from the plethora of postings or interactions with the contact center 116.

The dialog creator 220 can create a dialog data structure that includes instructions for various states for each message that comes into the contact center 116. The first instruction might be to send the message to the trend analysis component 212, then to the processing component 214, and then execute a query of a Customer Relationship Management (CRM) database 232 (to determine if this user has an existing order). A CRM database 232 can be a database as described in conjunction with FIGS. 7 and 8 and can store information about customers or other data related to customer relations. Finally, the dialog data structure 220 may decide that the communication or message should be sent to a human agent 228 for processing. The instructions or node transitions are executed in the dialog core 210 and make use of many different components that the dialog creator 220 combines in any way the user desires to handle the communications and/or messages. The dialog core 210 can make use of the trend analysis component 212, processing component 214, or other systems. The dialog core 210 may also interface with a CRM system and/or database 232, external databases, social media user information (e.g., followers, friends, post history, etc. from the social media site), or other systems.

The trend analysis component 212 is operable to analyze trends that occur between two or more communications and/or messages received by the contact center server 116. The two communications and/or messages can be from different contacts 108 and/or social media networks 140, so that the trend analysis component 212 can identify trends across several different communications and/or social media networks 140. Trends can include multiple occurrences of the same word or phrase, multiple occurrences of a customer identity, product name or service, or multiple occurrences of some other information that might indicate a trend. Further, the trend analysis component 212 may be able to identify escalations in the occurrences of particular text, identities, or other information, or may identify multiple occurrences over a period of time. The trend analysis component 212 may also be able to apply one or more different algorithms to occurrences of information within the contact center server 116 and/or the social media networks 140. For example, the trend analysis component 212 can match the number of occurrences of a phrase or word over a period of time and apply analysis to determine if the occurrences are increasing or decreasing over the period of time.

The processing component 214 is operable to analyze phonemes, audio files, and/or text of one or more communications and/or messages from the contact center server 116, social media networks 140, or other contacts. Some possible methods for processing can include Regular Expression, Latent Semantic Indexing (LSI), text part of speech tagging, text clustering, N-Gram document analysis, etc. In addition, for possibly longer documents, (such as, blogs or emails), the processing component 214 may execute one or more methods of document summarization. The summarization may occur if the document will be sent to an agent 228 of the contact center 116; the summarization can reduce the amount of information that the agent 228 may manage. The text processing rules or models may be stored in and/or retrieved from a processing rules database 230. The processing rules database 230 can be a database as described in conjunction with FIGS. 7 and 8 that stores rules or models used by the processing component 214.

The processing component 214 can identify one or more occurrences of a particular phoneme set and/or text, such as using one or more of the message fields referenced above, in order to associate that communication with one or more dialogs data structures in the heuristic rules and dialog database 218. For example, the processing component 214 can look for the word "manual,]". If the word "manual" is found, the processing component 214 may retrieve a dialog data structure from the heuristic rules and dialogs database 218 and, as the dialog data structure instructs, communicate with the customer about one or more owner's manuals, repair manuals, or other types of manuals. In another example, if the message includes the words, "buy", "sell", "price, "discount" or other types of words that may indicate the user or customer wishes to buy a product, the processing component 214 can retrieve one or more dialog data structures from the heuristic rules and dialogs database 218 that can provide instruction to assist the customer in purchasing products or services from the enterprise. An embodiment of the processing component 214 is as described in conjunction with FIG. 3.

The analysis tools component 216 is operable to analyze response communications and/or messages received back from an agent interface 224. In analyzing the agent's responses, the analysis tools component 216 can determine if the dialog data structures originally retrieved by the processing component 214 met the needs of the customer. In the analysis, the agent 228 may enter one or more items of information, for the analysis tools component 216, about the response and about how the response matched with the dialog data structures. The analysis tools component 216 can review the response and determine if it was similar to the response provided by the dialog data structure. Thus, the analysis tools component 216 can provide information to the dialog core 210 or the dialog creator 220 to improve the dialog data structures that are included in the heuristic rules and dialogs database 218.

Figure 7:
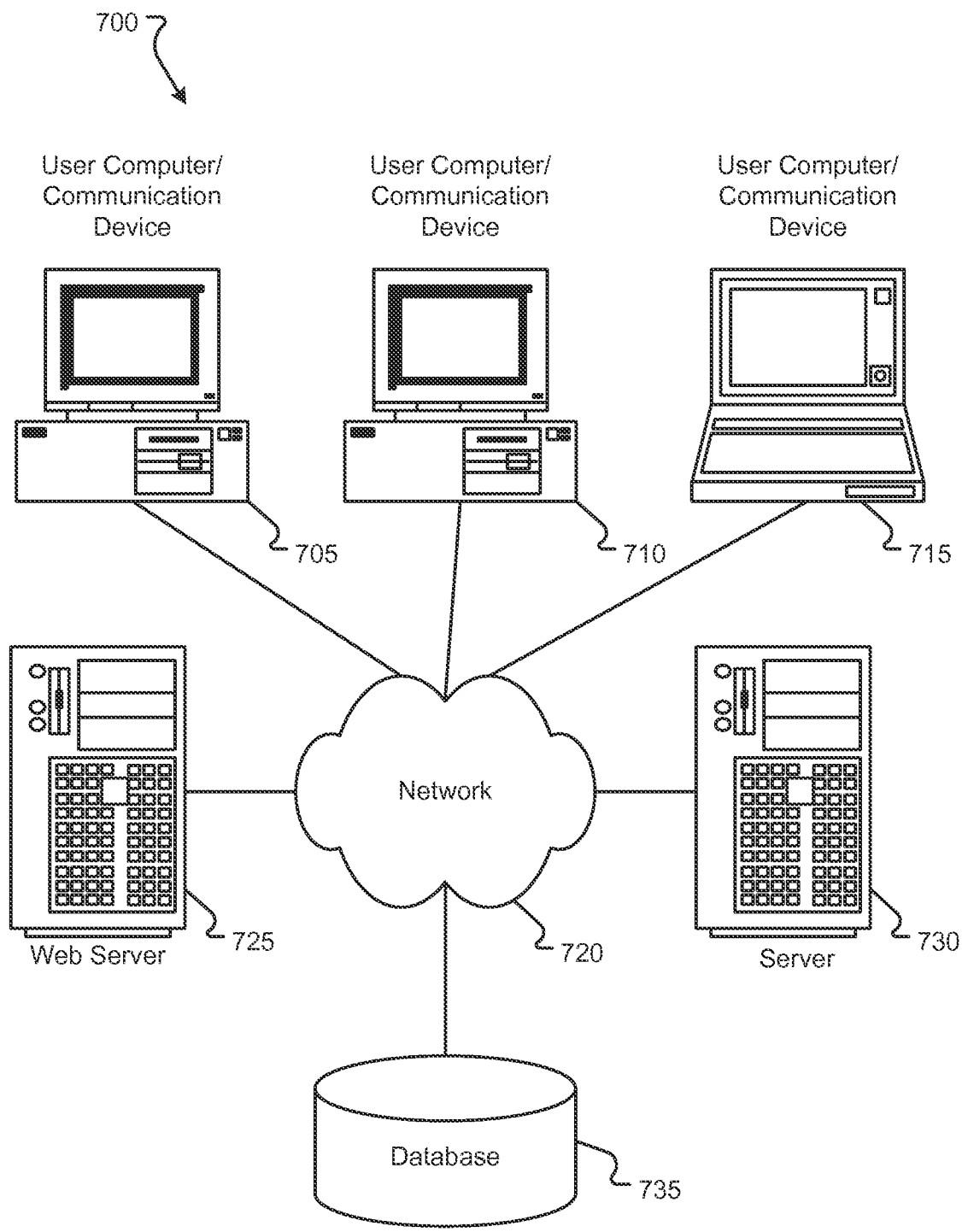
FIG. 7 is a block diagram of an embodiment of a computing environment.
Figure 8:
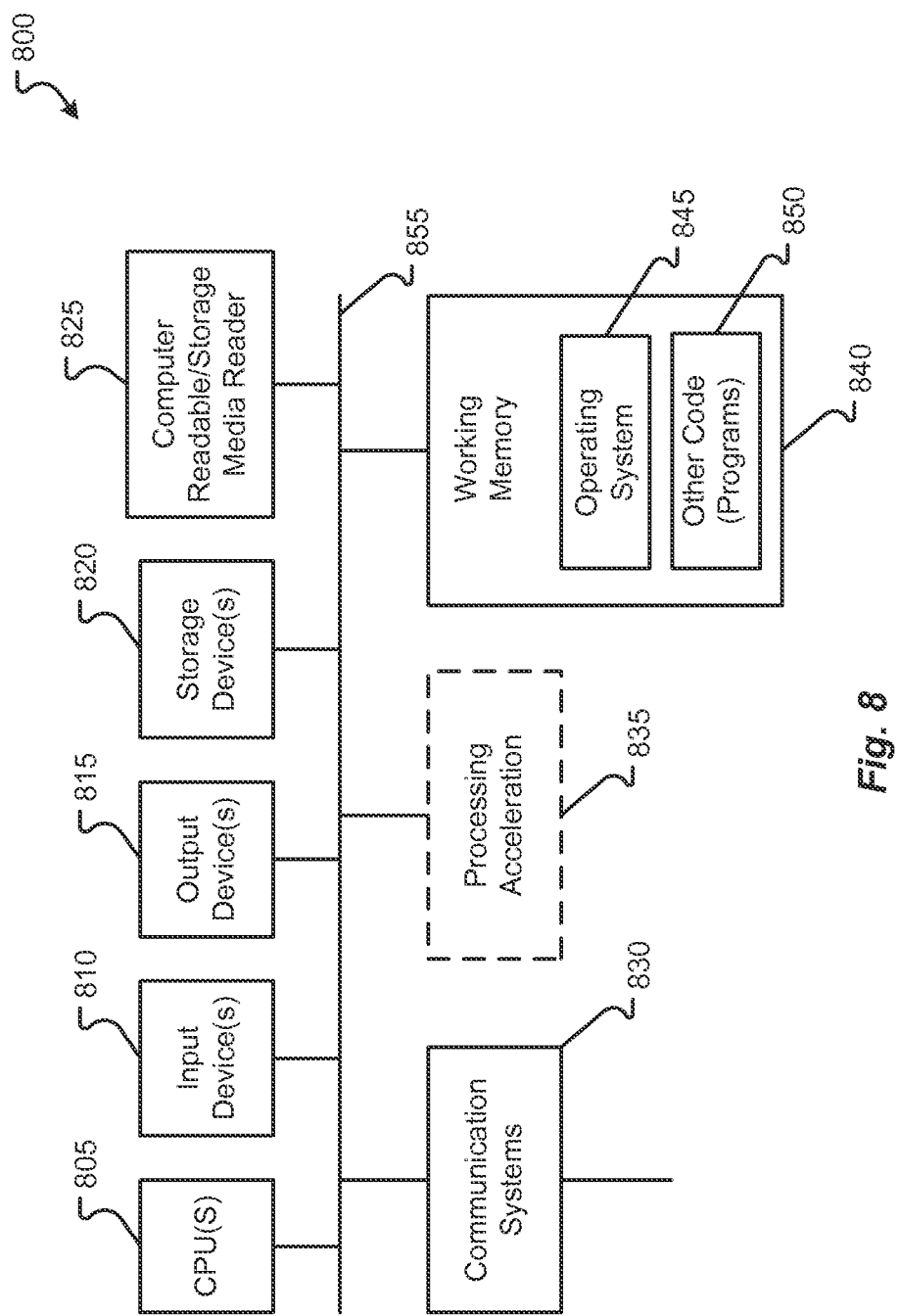
FIG. 8 is a block diagram of an embodiment of a computer system.

The message history database 222 can be any database or data storage system as described in conjunction with FIGS. 7 and 8. Thus, the message history database 222 can store data in data fields, objects, or other data structures to allow other systems to retrieve that information at a later time. The message history database 222 can store previous communications and/or messages or information about previous messages. Thus, for example, if the trend analysis component 212 is analyzing several communications and/or messages over a period of time, the trend analysis component 212 can retrieve information about previous communications and/or messages associated with the current analysis from the message history database 222. As such, the trend analysis component 212 can better detect trends occurring at the contact center server 116. The data stored by the message history database 222 can include the entire communications and/or message or only a portion of the communications and/or message, and in some circumstances, include metadata about the message(s).

The heuristic rules and dialogs database 218 can be any type of database or data storage system as described in conjunction with FIGS. 7 and 8. The heuristic rules and dialogs database 218 can store information in data fields, data objects, and/or any other data structures. The heuristic rules and dialogs database 218 stores rules and dialogs data structures that automate responses to received messages. The dialogs data structures control the interaction between the dialog core 210 and the social media network 140. The dialogs or heuristic rules can be created by a dialog creator 220. Thus, the dialog creator 220 can interface with user input 226 to receive information about dialogs. The user input 226 is then used to form the states and responses for a dialog data structure.

An agent interface 224 is a communication system operable to send action items to contact center agents 228, in the contact center 116. An agent can be a person or other system that is operable to respond to certain questions or requests from a customer. For example, the agent 228 can be a person that has specialized expertise in a topic area, such as technical support. The agent interface 224 can format the social message into an action item and forward that communications and/or message to one or more agents 228. The agent interface 224 can also receive response(s) back from the agents 228. The information provided by the agent 228 may be used by the dialog core 210 to complete a response to the communication, message, or other contact.

Figure 3:
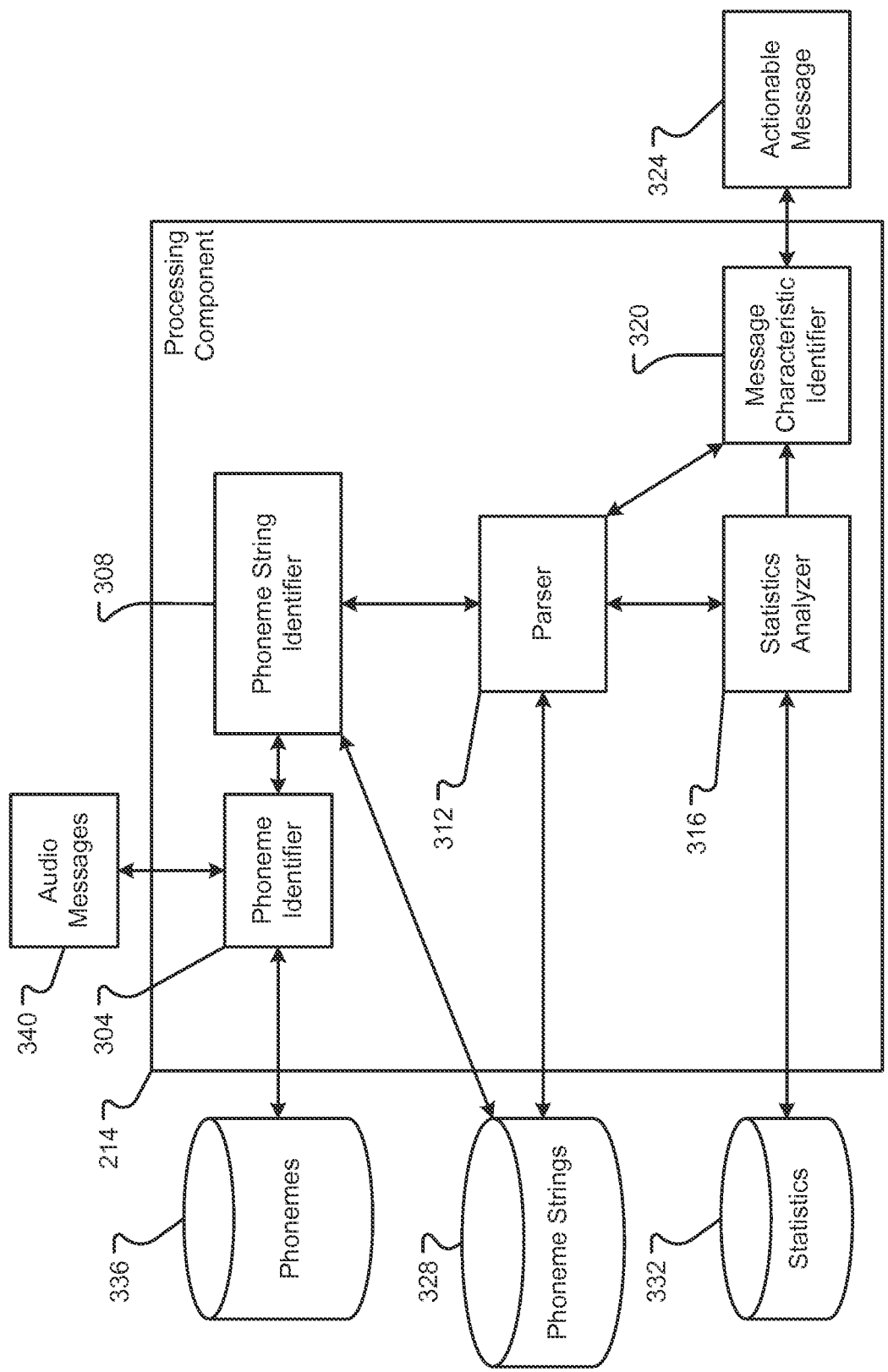
FIG. 3 is a block diagram of an embodiment of a processing component.

An embodiment of a processing component 214 is shown in FIG. 3. As explained previously, the processing component 214 can be a module that is embodied in hardware, software, and/or hardware and software. The processing component 214 can include one or more sub-modules or components. These components may provide certain functionality and be able to access one or more databases. The databases can include a phonemes database 336, a phoneme strings database 328, and a statistics database 332. These databases 328-336 may be flat file databases, relational databases, or any other type of database used to store, retrieve and manage information or data. The phonemes database 336 can include one or more phonemes as described herein. The phoneme strings database 328 can include the one or more negative/positive sets or strings of phonemes, as described herein. The statistics database 332 can include the statistics about the negative/positive sets or strings of phonemes, including any confidence score, confidence interval, and/or probability that the negative/positive sets or strings of phonemes stored in the phoneme strings database 328 can connote negative/positive sentiment.

A phoneme identifier 304 can receive one or voice communications or audio-recorded messages. The phoneme identifier 304 can then evaluate the audio file(s) to locate any of the phonemes. Generally, there are a finite number of phonemes in speech, regardless of the language. The arrangement of the phonemes may be different, i.e., the syntax of the speech differs across different languages. However, the phonemes used in speech may have a definite set based on the possible sounds that may be made by human beings using their voice, mouth, tongue, etc. These phonemes may be stored in the database and/or data-store 336.

The phoneme identifier 304 can extract the phonemes from the database and/or data-store 336 to compare to one or more audio files. Thus, the phoneme identifier 304 identifies phonemes in one or more audio files phoneme string identifier.

To identify the phonemes, the phoneme identifier 304 may partition the audio file into predetermined time intervals or frames. For example, the audio file may be partitioned into one second time intervals. Then, the phoneme identifier 304 can identify in which partitions a phoneme exists. In other circumstances, the frames may be dynamically created based on pauses or other speech patterns and may contain one or more phonemes. In still other situations, the phoneme identifier 304 can identify the phonemes, without partitioning the audio file, and then indicate a temporal placement and duration for the phoneme within the audio file.

Regardless, the phoneme identifier 304 can identify the phonemes in the received audio file and output a record or index file that includes the phonemes found in the audio file. Thus, the phoneme identifier 304 can concatenate together set by set, the sequence of phonemes per frame, which produces the index file.

The phoneme string identifier 308 may receive the index file(s) from the phoneme identifier 304. The phoneme string identifier 308 can then identify and store phoneme sets or strings in database 328. To identify the phoneme strings, the phoneme string identifier 308 may use one or more methods to analyze past messages or index files. In one situation, the phoneme string identifier 308 may receive index files for a set of audio recording with a same characteristic. The phoneme string identifier 308 may determine which phoneme strings exist or a common to a statistically significant portion of the set of index files. Thus, the phoneme string identifier 308 may identify one or more sets of two or more phonemes that are associated with the known characteristics. Upon identifying the one or more sets of phonemes, the phoneme string identifier 308 can store the identified sets of phonemes in the database 328.

The database 328 can store and provide phoneme strings that are associated a particular characteristic for messages in a predetermined language. Another process to refine or build the phoneme strings stored in the database 328 can involve the phoneme string identifier 308 obtaining two or more sets of index files, with each set of index files having a predetermined characteristic. The predetermined characteristics of the sets of index files can have complementary, analogous, or opposite meanings. The phoneme string identifier 308 may use a latent semantic indexing (LSI) process to obtain one or more multi-phoneme string(s) (it should be noted the maximum and minimum lengths of the phoneme strings can be set in the LSI process corresponding to "N-Grams") that may be used to identify the characteristic(s) in the index files. For example, phoneme strings that are common to two or more different sets of the index files cannot differentiate the sets, and thus, are not output by the LSI process. However, phoneme strings that are common to one of but not to the other sets index files may be output by the LSI process. For example, phoneme strings that are present in a first set of index files having a first characteristic but that are not present in the other one or more index files having one or more different characteristics may represent phoneme strings that differentiate the first set of index files.

In still another process to refine or build the phoneme strings stored in the database 328 the phoneme string identifier 308 may obtain a new set of index files to compare to an "old" set of index files. The old set of index files may represent two or more index files that were previously used to generate the one or more phoneme strings currently stored in the database 328. The phoneme string identifier 308 may again use a LSI process to Obtain one or more multi-phoneme string(s) (it should be noted the maximum and minimum lengths of the phoneme strings can be set in the LSI process corresponding to "N-Grams") that may be used to identify the characteristic(s) in the index files. For example, phoneme strings that are present in the old or original set of index files or in the phoneme strings stored in the database 328 but that are not present in at least some of the new index files may represent phoneme strings that are no longer being said in the recordings, and thus, are potentially pointing to topics that are no longer being discussed. Missing phoneme strings (i.e., phoneme strings in the original set of index files or in the database 328) may also indicate some phoneme strings are no longer being used in call center scripts, etc., and should be removed from the database 328. Phoneme strings that are present in the new index files only may indicate new language being used in the contact center that was not seen in earlier calls, and thus could point to new topics under discussion or determinative of the characteristic. Obviously, new phoneme strings could also indicate that new scripts used by call center agents exist or have been developed. The phoneme strings indicating new agent scripts may be removed from the database 328.

In an example, the phoneme string identifier 308 can receive the index file output from the phoneme identifier 304 having one or more phonemes identified. The phonemes may then be used to locate phoneme strings within the message that may be correlated with a sentiment (e.g., the caller or customer is angry, happy, disappointed, etc.) of a message. A phoneme string can be a particular collection of two or more phonemes in which the phonemes may have a particular order, temporal association, and other characteristics. There may be a physical proximity or phoneme string density (i.e. the rate or number of occurrences within the set of index files) within the message that indicates to the phoneme string identifier 308 that these identified phoneme strings are associated with a particular characteristic of the message and/or may connote sentiment because of their relation or association to the phoneme strings. These phoneme strings may then be stored in the phoneme strings database 328.

A parser 312 may extract the phoneme strings from the index file(s) and store those phoneme strings in the phoneme strings database 328. Here, the parser 312 may be able to extract phoneme strings and store those phoneme strings, and may also provide other information in the phoneme strings database 328. For example, the parser 312 may provide a number of instances, some type of correlation between the phoneme strings and a predetermined characteristic of the index files, or other information in the phoneme strings database 328. The phoneme strings information may also be passed from the parser 312 to the statistics analyzer 316.

The statistics analyzer 316 may be operable to review instances of a phoneme string being used within one or more index files. The analysis information is stored in the statistics database 332. Here, the statistics analyzer 316 can attempt to determine, by multiple instances of a phoneme strings being identified in index files, whether that phoneme string(s) has a statistical confidence score of connoting a characteristic. The statistics analyzer 316 can use known statistical techniques to determine a confidence interval, which can include a confidence score, that a phoneme string having consistent and continuous in relation to a predetermined characteristic may indeed connote the characteristic. Upon reaching some threshold, for example, the confidence interval of 90%, the statistics analyzer 316 may then provide that phoneme string to a message characteristic identifier 320 to use in evaluating future messages.

A message characteristic identifier 320 may receive an index file generated from anew message 304, one or more phoneme strings from the parser 312, and/or information about the statistics associated with the phoneme strings from statistics analyzer 316. With this information, a message characteristic identifier 320 can locate the phoneme strings within the index file and determine if the message likely has a particular characteristic. If the message does have the characteristic, that message may be actionable. The actionable message, therefore, may then be sent onto an agent interface 224 to be routed to an agent 228. It is at this time that the message can be analyzed by a human or other agent. Thus, using the system of FIG. 3, only messages that are believed to have a particular characteristic can be addressed or provided to agents. This process thus eliminates a great number of messages that need not be analyzed.

Figure 4:
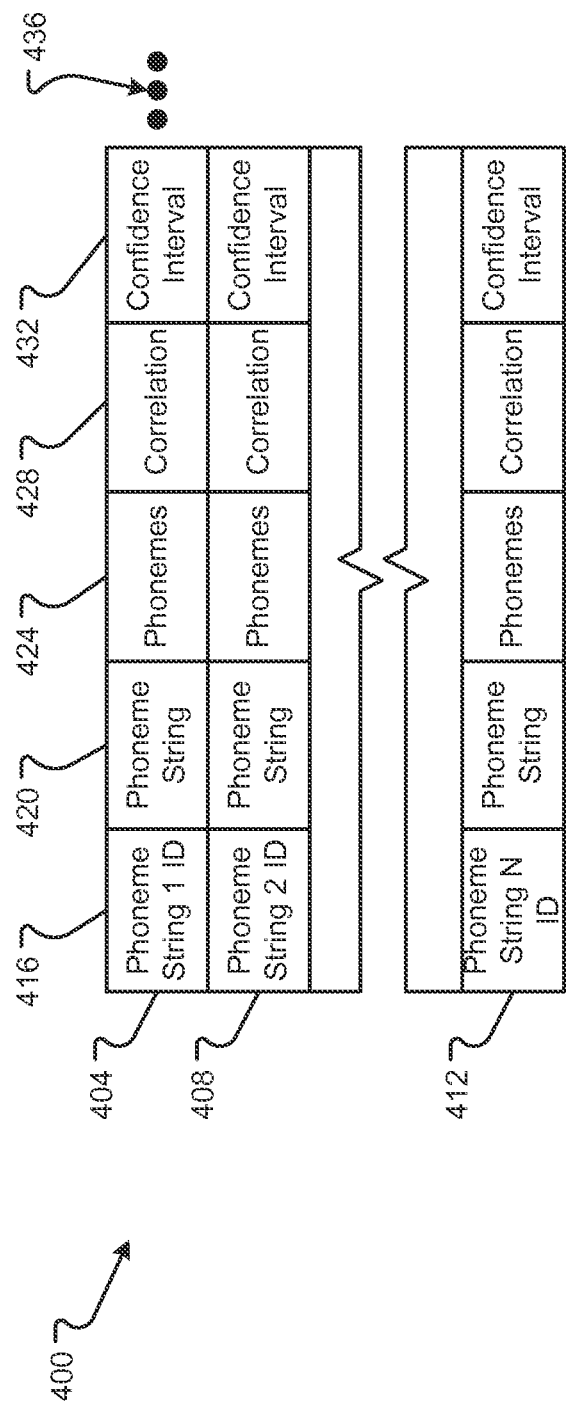
FIG. 4 is a block diagram of an embodiment a data structure or database for storing phonemes, associated phoneme strings, and/or statistics pertaining thereto.

A database 400 for storing phoneme strings, which may be the same or similar to phoneme strings database 328, along with any information about statistics 332 or phoneme strings in database 236, may be shown in FIG. 4. Here, the information in these separate databases 328 through 336 are shown as being consolidated into one data structure 400, but may be stored in separate databases. The data structure 400 can include one or more rows 404, 408, 412, which may each be associated with a phoneme string. Each row may include different fields or portions that are associated with the phoneme string. For example, the fields can include one or more of, but are not limited to, a phoneme string identifier 416, the phoneme string 420, the phoneme(s) 424, a correlation statistics 428, and/or a confidence interval 432. The rows 404-412, within the data structure 400, can include more or fewer fields than those shown in FIG. 4, as represented by ellipses 436. Further, there may be more or fewer rows 404 through 412 than those shown in FIG. 4.

The phoneme string identifier 416 can be any type of identifier that provides a way of identifying the phoneme string. The phoneme string identifier 416 can be an alphanumeric identifier, a globally unique identifier (GUM), or some other identifier that uniquely identifies the phoneme string amongst other phoneme strings within the database 400.

The phoneme string may be provided in field 420. Here, the phoneme string 420 is listed with any information required to identify or provide that phoneme string 420. The phoneme string identifier field 416 and the phoneme string field 420 may be searched to locate the phoneme string to update statistics in fields 428 and/or 432. The phoneme string field 420 can include the order of the two or more phonemes, which may be included in the phoneme string field 420 or included in the phonemes field 424, the information about any temporal association (e.g., the amount of time or time intervals between two of the two or more phonemes in the phoneme string), and any other metadata related to the phoneme string.

One or more phonemes may be listed in field 424 that have been associated with phoneme string 420. Thus, each phoneme string 420 may have been associated with or identified because of one or more phonemes 424. The more phonemes listed in field 424 connotes a higher confidence score that phoneme string 420 is associated with the characteristic.

A correlation field 428 can provide some type of score that quantifies the possibility that the phoneme string 420 is correlated with the characteristic. The correlation may be a number based on the number of instances the phoneme string has been found within a set of index files or messages having the same characteristic, based on output from an LSI process, based on other text analysis, or based on other information. The correlation field 428 can store the highest correlation, store an average correlation, or may store both a highest and average correlation for one or more of the phoneme strings 420.

The confidence interval 432 may be a statistical confidence interval that the phoneme string 420 does connote a characteristic. The confidence interval 432 may be created over several instances of index file analysis. Thus, as the phoneme string 420 becomes more prevalent in index files and is consistently found with the characteristic, the confidence interval rises. The confidence interval 432, thus, suggests a probability that a phoneme string 420 is, or connotes, the characteristic in a message.

Figure 5:
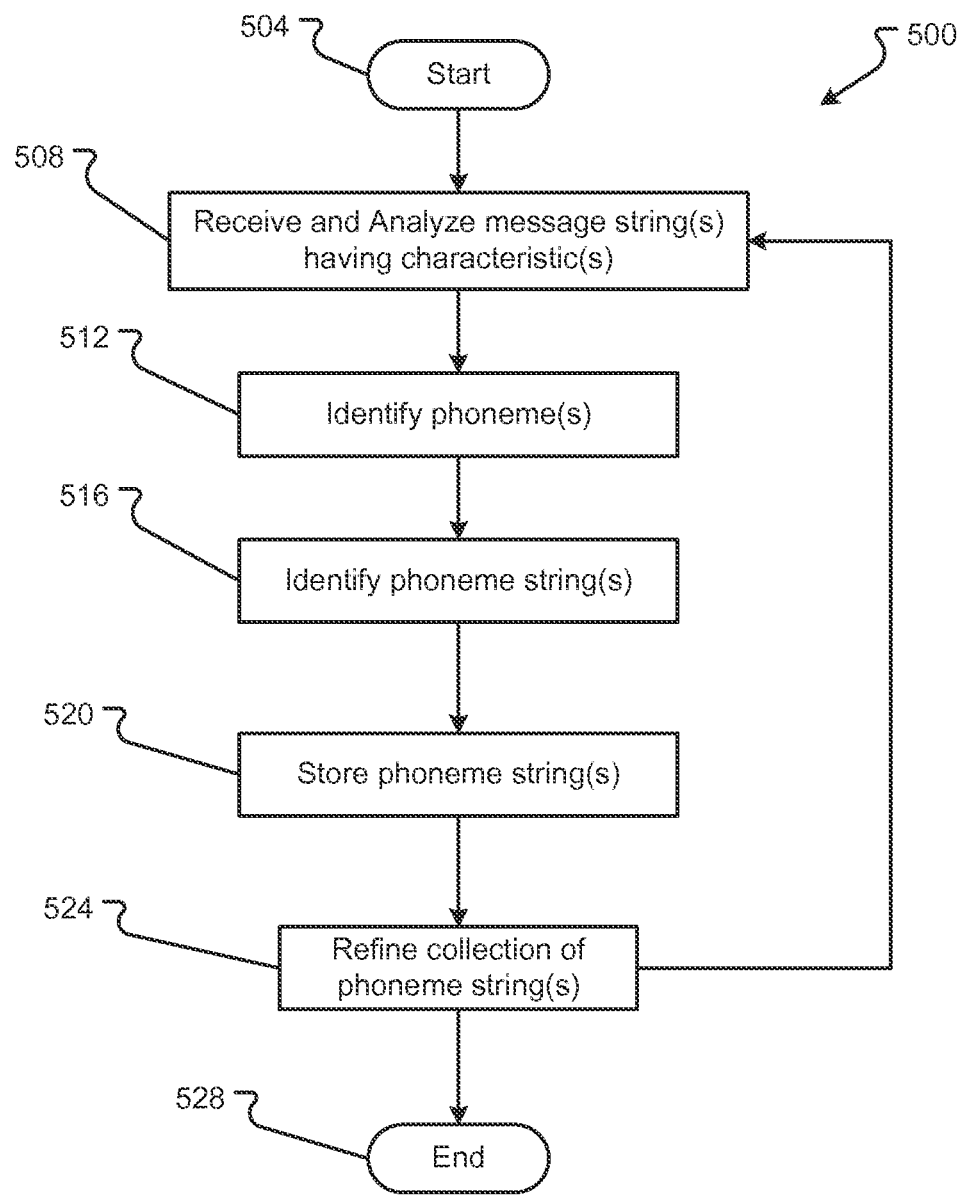
FIG. 5 is a flow diagram of an embodiment a process for identifying phoneme strings.

An embodiment of a method 500 for determining phoneme strings is shown in FIG. 5. Generally, the method 500 begins with a start operation 504 and terminates with an end operation 528. While a general order for the steps of the method 500 are shown in FIG. 5, the method 500 can include more or fewer steps or arrange the order of the steps differently than those shown in FIG. 5. The method 500 can be executed as a set of computer-executable instructions, executed by a computer system, and encoded or stored on a computer readable medium. Further, the method 500 can be executed by a gate or other hardware device or component in an Application Specific Integrated Circuit, a Field Programmable Gate Array, or other type of hardware device. Hereinafter, the method 500 shall be explained with reference to the systems, components, modules, software, data structures, user interfaces, etc. described herein.

The phoneme identifier 304 can analyze messages 304 having a known characteristic, in step 508. Thus, the phoneme identifier 304 can be provided with two or more messages that have known characteristic a negative/positive sentiment). From these messages, the phoneme identifier 304 can locate occurrences of certain phonemes within that message. In one example, the phoneme identifier 304 may locate phonemes within frames used to temporally partition the message. Thus, the phoneme identifier 304 may partition the message into frames and the analyze each frame to determine the presence of a phoneme within the frame.

The phoneme identifier 304 then identifies the phonemes, in step 512. The identification can be through phoneme processing algorithms. For example, the phoneme identifier 304 may compare the phonemes stored in database 336 with the phoneme located in each frame. When a match is determined, the phoneme identifier 304 can record the phoneme into a datastore or into an index file. As more messages 304 are provided to the phoneme identifier 304, the phoneme identifier 304 can continue to identify phonemes, in step 512.

The phoneme identifier 304 may then store the phonemes identified and information about the phonemes in an index file. The index file may then be provided to the phoneme string identifier 308. The phoneme string identifier 308 can receive and analyze the index file with the identified phonemes, in step 516. Using processing techniques, such as LSI or other algorithmic analysis, the phoneme string identifier 308 can determine one or more phoneme strings that may indicate or be associated with a particular characteristic. As explained above, the phoneme string identifier 308 may use different processes, involving one or more sets of index files, to determine which phoneme strings may indicate a give characteristic. The analysis or identification of phoneme strings may include the analysis of two or more index files or information from two or more audio messages. Thus, the phoneme string identifier 308 can better equate which phoneme strings are associated with a characteristic associated with the two or more index files.

The phoneme identifier 304 may then store the phoneme strings, in step 520. Here, phoneme identifier 304 parses or extracts the phoneme string(s), and stores those phoneme string(s) in the phonemes database 336. These phoneme string(s) in database 336 may then be used thereinafter for analyzing other messages. The phoneme string identifier 308 may also refine the collection of phoneme string(s) in database 336, in step 524. Here, either periodically or upon direction by a user, the process 500 may repeat with new or other sets of audio messages to ensure or refine which phoneme string(s) are associated with particular characteristics. The processes to refine the collection of phoneme string(s) in database 336 may be as described herein before.

Figure 6A:
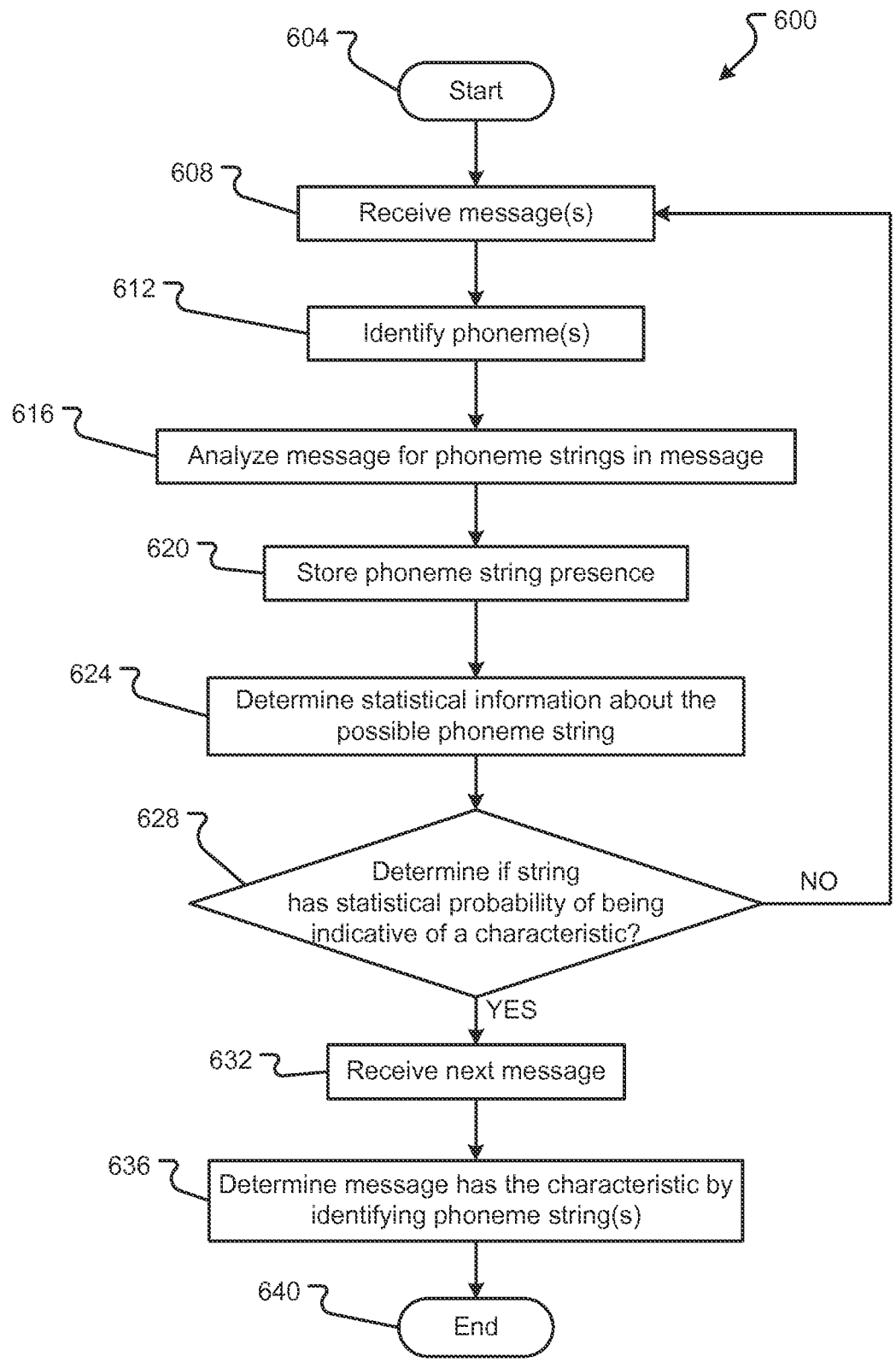
FIG. 6A is a flow diagram of an embodiment a process for identifying a characteristic in a message associated with one or more phoneme strings.

An embodiment of a method 600 for identifying a message characteristic using phoneme strings is shown in FIG. 6A. Generally, the method 600 begins with a start operation 604 and terminates with an end operation 640. While a general order for the steps of the method 600 are shown in FIG. 6A, the method 600 can include more or fewer steps or arrange the order of the steps differently than those shown in FIG. 6A. The method 600 can be executed as a set of computer-executable instructions, executed by a computer system, and encoded or stored on a computer readable medium. Further, the method 600 can be executed by a gate or other hardware device or component in an Application Specific Integrated Circuit, a Field Programmable Gate Array, or other type of hardware device. Hereinafter, the method 600 shall be explained with reference to the systems, components, modules, software, data structures, user interfaces, etc. described herein.

The contact center server 116 can receive audio messages, in step 608. The contact center server 116 can receive an audio message or communication from a customer device 108, through a communications network 112, which is sent through an enterprise network 128 to a contact center server 116. In other situations, the contact center server 116 may receive an audio message through a social media network 140. The audio messages may then be provided to the dialog core 210. Specifically, the processing component 214 of the dialog core 210 can receive the messages.

A phoneme identifier 304 may then receive the audio messages 340. The phoneme identifier 304 may then retrieve one or more phonemes from phonemes database 336. The phonemes can then be used to analyze audio messages 340 to determine or identify phonemes within the audio content of the messages 340, in step 612. Here, the phoneme identifier 304 does a scan or compare between the phonemes and the audio content in the message 340. Any located phonemes are then flagged, indicated, or identified, and an index file of identified phonemes in the audio message 340 may be passed to the phoneme string identifier 308.

The phoneme string identifier 308 can then analyze the message for phoneme strings in the index file provided by the phoneme identifier 304. A phoneme string identifier 308 can analyze the index file for the phoneme strings, in step 616, to determine which phoneme strings may be associated with a particular characteristic. Here, the phoneme string identifier 308 attempts to find phoneme strings that have had previous appearances in previous messages, or phoneme strings that have some type of correlation with the characteristic. These phoneme strings can be constructed based on physical proximity of the phonemes, rate of occurrence of the phoneme strings, or some other information. Any phoneme string within the message 340 that appears to be indicative of the characteristic may be passed to the parser 312.

The parser 312 can extract the phoneme strings from the index file and store those message phoneme strings in a phoneme strings database 328, in step 620. The information in the database 328 continues to be updated as phoneme strings are identified, or instances of phoneme strings are identified, and any information about phoneme strings in an index file may be passed to statistics analyzer 316.

The statistics analyzer 316 can then determine statistical information about the possible phoneme string, in step 624. Here, the statistics analyzer 316 can compute a correlation 428 and/or a confidence interval 432 for each of the phoneme strings identified in the index file. The statistics may be continuously updated as new messages are received and possible new or recurrent instances of a phoneme string(s) are used. At some point thereinafter, the statistics analyzer 316 can determine if a phoneme string has a statistical confidence score of being indicative of the characteristic, in step 628. Here, if the phoneme string reaches a predetermined threshold, for example, a confidence interval of 90%, the statistics analyzer 316 then denotes that the phoneme string can be used to indicate the characteristic in messages. Utile phoneme string does have a statistical confidence score indicating that the phoneme string is associated with the characteristic, the method 600 proceeds YES to step 632. If the phoneme string does not have a statistical confidence score indicating that the phoneme string is associated with the characteristic, the method 600 proceeds NO to receive more messages in step 608 and further analyze that phoneme string(s).

In step 632, a next message is received. This next message may be provided to the message characteristic identifier 320. The message characteristic identifier 320 can receive a list of phoneme strings from the parser 312 with any associated statistical information from the statistics analyzer 316. The phoneme identifier 304 may output an index file with determined phonemes for the next message and then the phoneme strings in the database 336 may then be compared against the newly received index file to determine if the phoneme string(s) exists within the audio message. If the phoneme strings do appear within the index file, and if the instances appear to be in a great enough concentration, the message characteristic identifier 320 can determine that the message has the characteristic, in step 636. The message with the characteristic may then be sent, as an actionable message 324, to agent interface 324 to be routed to an agent 228.

Figure 6B:
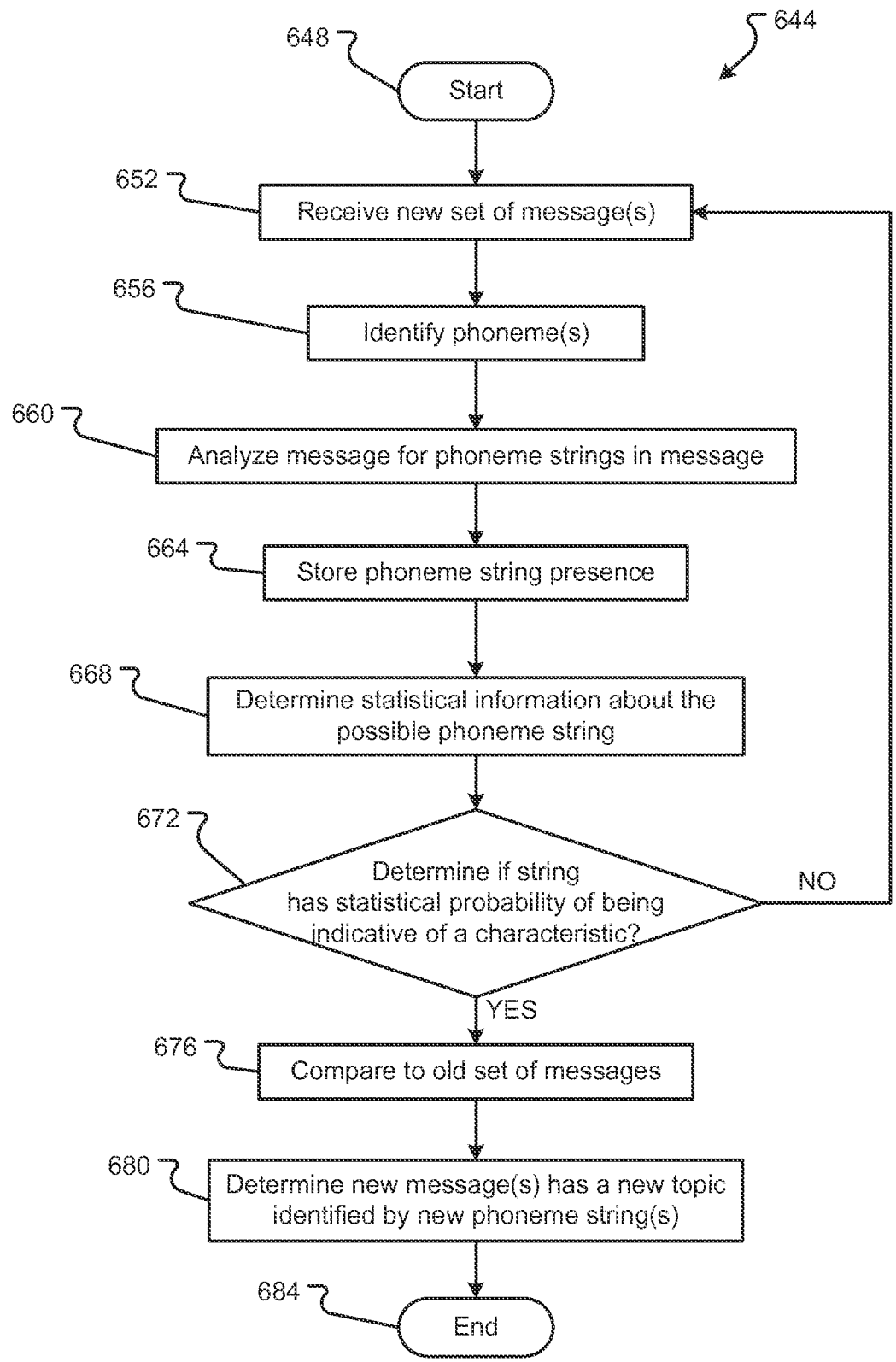
FIG. 6B is a flow diagram of an embodiment a process for identifying a new topic in a new set of audio messages.

An embodiment of a method 644 for identifying a new topic in a new set of audio messages is shown in FIG. 6B. Generally, the method 644 begins with a stall operation 648 and terminates with an end operation 684. While a general order for the steps of the method 644 are shown in FIG. 6B, the method 644 can include more or fewer steps or arrange the order of the steps differently than those shown in FIG. 6B. The method 644 can be executed as a set of computer-executable instructions, executed by a computer system, and encoded or stored on a computer readable medium. Further, the method 644 can be executed by a gate or other hardware device or component in an Application Specific Integrated Circuit, a Field Programmable Gate Array, or other type of hardware device. Hereinafter, the method 644 shall be explained with reference to the systems, components, modules, software, data structures, user interfaces, processes, methods, etc, described herein.

The contact center server 116 can receive a new set of audio messages 340, in step 652. The contact center server 116 can receive anew audio message or communication from a customer device 108, through a communications network 112, which is sent through an enterprise network 128 to a contact center server 116. In other situations, the contact center server 116 may receive a new audio message through a social media network 140. The new set of audio messages 340 may then be provided to the dialog core 210. Specifically, the processing component 214 of the dialog core 210 can receive the new messages.

A phoneme identifier 304 may then receive the new set of audio messages 340. The phoneme identifier 304 may then retrieve one or more phonemes from phonemes database 336. The phonemes can then be used to analyze the new set of audio messages 340 to determine or identify phonemes within the audio content of the messages 340, in step 656. Here, the phoneme identifier 304 does a scan or compare between the phonemes and the audio content in the new message 340. Any located phonemes are then flagged, indicated, or identified, and an index file of identified phonemes in the new audio message 340 may be passed to the phoneme string identifier 308.

The phoneme string identifier 308 can then analyze the new set of audio messages for phoneme strings in the index file provided by the phoneme identifier 304. A phoneme string identifier 308 can analyze the index file for the phoneme strings, in step 660, to determine which phoneme strings may be associated with a particular or new characteristic. Here, the phoneme string identifier 308 attempts to find phoneme strings that have had previous appearances in previous messages, or phoneme strings that have some type of statistically-significant correlation with a characteristic. These phoneme strings can be constructed based on physical proximity of the phonemes, rate of occurrence of the phoneme strings, or some other information. Any phoneme string within the new messages 340 that appears to be indicative of a characteristic may be passed to the parser 312.

The parser 312 can extract the phoneme strings from the index file and store those message phoneme strings in a phoneme strings database 328, in step 664. The information in the database 328 continues to be updated as phoneme strings are identified, or instances of phoneme strings are identified, and any information about phoneme strings in an index file may be passed to statistics analyzer 316.

The statistics analyzer 316 can then determine statistical information about the possible phoneme string, in step 668. Here, the statistics analyzer 316 can compute a correlation 428 and/or a confidence interval 432 for each of the phoneme strings identified in the index file. The statistics may be continuously updated as new messages are received and possible new or recurrent instances of a phoneme string(s) are used. At some point thereinafter, the statistics analyzer 316 can determine if a phoneme string has a statistical confidence score of being indicative of the characteristic or indicative of a new characteristic, in step 672. Here, if the phoneme string reaches a predetermined threshold, for example, a confidence interval of 90%, the statistics analyzer 316 then denotes that the phoneme string can be used to indicate the characteristic in messages. If the phoneme string does have a statistical confidence score indicating that the phoneme string is associated with the characteristic, the method 644 proceeds YES to step 676. If the phoneme string does not have a statistical confidence score indicating that the phoneme string is associated with the characteristic, the method 644 proceeds NO to receive more messages, in step 652, and further analyze that phoneme string(s).

In step 676, the message characteristic identifier 320 can compare one or more new phoneme strings to an old set of messages. The old set of messages may be identified by several processes used either alternatively or in combination. First, a predetermined time period may be established by a user or as a default setting. For example, any message older than three months, two weeks, 24 hours, etc. may be an old message. Second, any message having a creation date before the current set of messages may be considered an old message. Third, the old set of messages may be pre-established by marking a set of messages as part of the group. The marking may be done automatically or by user input. Fourth, any message received within a time period, for example, in the past three months, past six weeks, etc. may be an old message. Fifth, the old message set may be a pre-defined number of messages, for example, the past 50 messages, past 1000 messages, etc. Other characteristics may be used to identify or limit the set of old messages, including any other characteristic the old set of messages may have, e.g., topic, recipient, caller, etc.

Once the old set of messages is identified, the message characteristic identifier 320 can compare the newly-identified phoneme string to the old set of messages to determine if the new phoneme string is present in the old set of messages. Thus, the message characteristic identifier 320 can scan the messages in the old set of messages to determine if the phoneme string is present in any of the messages. If the new phoneme string is present, then the message characteristic identifier 320 can determine that the new phoneme string does not indicate a new topic in the new set of messages, in step 680. However, if the phoneme string is not present, the message characteristic identifier 320 can indicate that the new phoneme string identifies or indicates a new topic is present in the new set of messages and may need to be addressed. Using this process, any emerging issues may be quickly and automatically identified.

It should be noted that each phoneme string may include two or more phonemes. Thus, in database 400, the phonemes 424 may be listed in two or more rows. Further, in some circumstances, each message received 340 may include two or more phonemes. More occurrences of particular phoneme strings within a message indicates that there is a higher confidence score that the message 340 has a characteristic. Further, the accumulation of phoneme strings in a message may bolster the possibility of finding other phoneme strings or creating a better association between phoneme strings and characteristics. The phonemes 304 can be in English or other languages.

The ability to locate phoneme strings and then identify characteristics in a set of audio messages 340, eliminates unneeded analysis. The advantage with such a processing system 100 is that not every message 340 received by the contact center server 116 needs to be analyzed. Determining whether messages that are identified as having a characteristic, based on the presence of phoneme strings in the audio content, need to be analyzed helps to greatly reduce the effort needed for the contact center 116 to review sets of audio messages.

Further, a database of phoneme strings 328 may be built automatically through the reception of several messages and over a period of time. Still further, as these phoneme strings are identified and have higher and higher statistical confidence score of connoting a particular characteristic, those phoneme strings 328 may then become indicators for other phoneme strings. This database 336, with its growing number of phoneme strings, may then be able to indicate, over a period of time, characteristics in any type of language or in any audio message received by the contact center server 116. This process, thus, provides the great advantage to analyze messages, without needing to have specific agents analyze each of the messages.

FIG. 7 illustrates a block diagram of a computing environment 700 that may function servers, computers, or other systems provided herein. The environment 700 includes one or more user computers 705, 710, and 715. The user computers 705, 710, and 715 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, and/or personal digital assistant, capable of communicating via a network 720 and/or displaying and navigating web pages or other types of electronic documents. Although the exemplary computer environment 700 is shown with three user computers, any number of user computers may be supported.

Environment 700 further includes a network 720. The network 720 may can be any type of network familiar to those skilled in the art that can support data communications using any of a variety of commercially-available protocols, including without limitation SIP, TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; extranet; a public switched telephone network ("PSTN"); an infra-red network; a wireless network (e.g., a network operating under any of the IEEE 802311 suite of protocols, the Bluetooth™ protocol known in the art, and/or any other wireless protocol); and/or any combination of these and/or other networks.

The system may also include one or more server 725, 730. In this example, server 725 is shown as a web server and server 730 is shown as an application server. The web server 725, which may be used to process requests for web pages or other electronic documents from user computers 705, 710, and 715. The web server 725 can be running an operating system including any of those discussed above, as well as any commercially-available server operating systems. The web server 725 can also run a variety of server applications, including SIP servers, HTTP servers, FTP servers. CGI servers, database servers, Java servers, and the like. In some instances, the web server 725 may publish operations available operations as one or more web services.

The environment 700 may also include one or more file and or/application servers 730, which can, in addition to an operating system, include one or more applications accessible by a client running on one or more of the user computers 705, 710, 715. The server(s) 730 and/or 725 may be one or more general purpose computers capable of executing programs or scripts in response to the user computers 705, 710 and 715. As one example, the server 730, 725 may execute one or more web applications. The web application may be implemented as one or more scripts or programs written in any programming language, such as Java™, C, C#™, C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the server 725 and/or 730 may be forwarded to a user computer 705 via a web (file) server 725, 730. Similarly, the web server 725 may be able to receive web page requests, web services invocations, and/or input data from a user computer 705 and can forward the web page requests and/or input data to the web (application) server 730. In further embodiments, the web server 730 may function as a file server. Although for ease of description, FIG. 7 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, web (file) server 725 and/or web (application) server 730 may function as the system, devices, or components described in FIGS. 1-4.

The environment 700 may also include a database 735. The database 735 may reside in a variety of locations. By way of example, database 735 may reside on a storage medium local to and/or resident in) one or more of the computers 705, 710, 715, 725, 730. Alternatively, it may be remote from any or all of the computers 705, 710, 715, 725, 730, and in communication (e.g., via the network 720) with one or more of these. The database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. The database 735 may be a relational database, such as Oracle 10i™, that is adapted to store, update, and retrieve data in response to SQL-formatted commands.

FIG. 8 illustrates one embodiment of a computer system 800 upon which the servers, computers, or other systems or components described herein may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage devices 820. By way of example, storage device(s) 820 may be disk drives, optical storage devices, solid-state storage devices such as a random access memory ("RAM") and/or a read-only memory ("ROM"), which can be programmable, flash-updateable and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. The computer system 800 may also include a processing acceleration unit 835, which can include a DSP, a special-purpose processor, and/or the like.

The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 820 (FIG. 8) and/or any other computer described above with respect to the computer system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 845 and/or other code 850. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A computer-implemented method for determining a characteristic in audio messages, the method comprising:
    receiving, by a processor, a first audio message via a network;
    partitioning, by the processor, the first audio message into two or more frames;
    identifying, by the processor, a first phoneme and a second phoneme in the two or more frames;
    producing, by the processor, a first index file by concatenating the two or more frames, wherein the first index file comprises a concatenation of the first and second phonemes;
    identifying, by the processor, a first phoneme string in the first index file by comparing the first index file with one or more existing index files, wherein the first phoneme string is associated with a first characteristic;
    based on identifying the first phoneme string in the first index file, determining, by the processor, that the first phoneme string indicates the first characteristic;
    receiving, by the processor, a second audio message from a website via the network;
    identifying, by the processor, the first phoneme string in the second audio message; and
    in response to identifying the first phoneme string in the second audio message, determining, by the processor, that the second audio message indicates the first characteristic.

2. The method as defined in claim 1, further comprising determining statistical information about the first phoneme string.

3. The method as defined in claim 2, wherein the statistical information includes a confidence score indicating a degree of confidence that the first phoneme string indicates the first characteristic.

4. The method as defined in claim 3, wherein the first characteristic is associated with one of a positive sentiment and a negative sentiment.

5. The method as defined in claim 3, further comprising:
    determining the confidence score does not reach or cross a predetermined threshold;
    receiving a third message; and
    in response to determining the confidence score does not reach or cross the predetermined threshold and in response to receiving the third message, re-calculating the confidence score using analysis associated with the third message.

6. The method as defined in claim 1, wherein the first and second phonemes are associated with the English language.

7. The method as defined in claim 3, further comprising:
    receiving, by the processor, a first set of audio messages;
    identifying, by the processor, a second phoneme string in the first set of audio messages, wherein the second phoneme string is associated with a second characteristic;
    comparing, by the processor, the second phoneme string in the first set of audio messages with at least two audio messages in a second set of audio messages;
    based on the comparing, determining, by the processor, the second phoneme string is absent from the second set of audio messages; and
    determining, by the processor, the second characteristic is a new topic present in the first set of audio messages.

8. The method as defined in claim 7, wherein each of the first and second phoneme strings includes two or more phonemes.

9. The method as defined in claim 8, further comprising:
analyzing a known negative message; and
identifying phoneme strings in the known negative message.

10. The method as defined in claim 3, wherein the confidence score is a probability, the method further comprising:
determining the confidence score reaches or crosses a predetermined threshold; and
based on determining the confidence score reaches or crosses the predetermined threshold, signifying the first phoneme string indicates the first characteristic.

11. The method as defined in claim 10, wherein each of the first and second audio messages includes two or more phonemes.

12. A non-transitory computer-readable storage medium having stored thereon computer-readable processor-executable instructions configured to cause one or more processors of a computing system to execute a method, the method comprising:
receiving a first audio message via a network;
partitioning the first audio message into two or more frames;
identifying a first phoneme and a second phoneme in the two or more frames;
producing a first index file by concatenating the two or more frames, wherein the first index file comprises a concatenation of the first and second phonemes;
identifying a first phoneme string in the first index file by comparing the first index file with one or more existing index files, wherein the first phoneme string is associated with a first characteristic;
based on identifying the first phoneme string in the first index file, determining, by the processor, that the first phoneme string indicates the first characteristic;
receiving, by the processor, a second audio message from a website via the network;
identifying the first phoneme string, associated with the first characteristic, in the second audio message;
identifying, by the processor, the first phoneme string in the second audio message; and
in response to identifying the first phoneme string in the second audio message, determining that the second audio message indicates the first characteristic.

13. The computer readable storage medium as defined in claim 12, further comprising instructions to determine statistical information about the first phoneme string, wherein the statistical information includes a confidence score indicating a degree of confidence that the first phoneme string indicates the first characteristic.

14. The computer readable storage medium as defined in claim 13, the method further comprising:
determining the confidence score reaches or crosses a predetermined threshold;
based on determining the confidence score reaches or crosses the predetermined threshold, signifying the first phoneme string indicates the first characteristic.

15. The computer readable storage medium as defined in claim 13, wherein each of the first audio message and the second audio message includes two or more phonemes.

16. The computer readable storage medium as defined in claim 12, wherein the first phoneme string comprises two or more phonemes.

17. A communication system comprising:
a dialog system operable to determine an agent routing for an audio message, wherein the dialog system comprises
a processing component operable to receive and analyze audio messages, wherein the processing component comprises:
a phoneme identifier operable to:
receive a first audio message via a network;
partition the first audio message into two or more frames;
identify a first phoneme and a second phoneme in the two or more frames; and
produce a first index file by concatenating the two or more frames, wherein the first index file comprises a concatenation of the first and second phonemes;
a phoneme string identifier in communication with the phoneme identifier, wherein the phoneme string identifier is operable to:
identify a first phoneme string in the first index file by comparing the first index file with one or more existing index files, wherein the first phoneme string is associated with a first characteristic; and
based on identifying the first phoneme string in the first index file, determine that the first phoneme string indicates the first characteristic; and
a message characteristic identifier operable to:
receive a second audio message from a website via the network;
identify the first phoneme string in the second audio message; and
in response to identifying the first phoneme string in the second audio message, determine that the second audio message indicates the first characteristic.

18. The communication system as defined in claim 17, further comprising a statistics analyzer operable to determine statistical information about the first phoneme string, wherein the statistical information includes a confidence score indicating a degree of confidence that the first phoneme string indicates the first characteristic.

19. The communication system as defined in claim 18, wherein the statistics analyzer is further operable to:
determine the confidence score reaches or crosses a predetermined threshold; and
based on determining the confidence score reaches or crosses the predetermined threshold, signify that the first phoneme string indicates the first characteristic.

20. The communication system as defined in claim 18, wherein the first characteristic is one of a positive sentiment and a negative sentiment.

* * * * *